US007853731B1

(12) United States Patent
Zeng

(10) Patent No.: US 7,853,731 B1
(45) Date of Patent: Dec. 14, 2010

(54) SYSTEM AND METHOD FOR EMBEDDED DISPLAYPORT LINK TRAINING

(75) Inventor: Xuming Henry Zeng, Sunnyvale, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 269 days.

(21) Appl. No.: 12/199,545

(22) Filed: Aug. 27, 2008

Related U.S. Application Data

(60) Provisional application No. 61/037,696, filed on Mar. 18, 2008.

(51) Int. Cl.
*G06F 3/00* (2006.01)

(52) U.S. Cl. ............................. 710/18; 710/19; 710/17; 710/62; 710/74

(58) Field of Classification Search ....................... None
See application file for complete search history.

(56) References Cited

U.S. PATENT DOCUMENTS 7,620,062 B2 * 11/2009 Kobayashi .................. 370/433
2009/0175397 A1 * 7/2009 Lee et al. .................... 375/376

* cited by examiner

*Primary Examiner*—Cheng-Yuan Tseng
(74) *Attorney, Agent, or Firm*—Kenneth Glass; Molly Sauter; Glass & Associates

(57) ABSTRACT

The method of the present invention includes loading a selected set of preset parameters into a source device and a sink device of the DisplayPort device of an embedded system. Link training is then performed between the source device and the sink device utilizing the first set of preset parameter and the link status (bit lock, symbol lock and inter-lane alignment) of the DisplayPort device is then read. If the link status indicates that the link training is successful, a link is established between the source device and the sink device, or if the link status indicates that the link training is unsuccessful, a different set of preset parameters is loaded and link training is then performed again. The steps of loading, performing and reading are repeated with each of the plurality of sets of preset parameters until the link status indicates that the link training is successful.

25 Claims, 4 Drawing Sheets

SYSTEM AND METHOD FOR EMBEDDED DISPLAYPORT LINK TRAINING

BENEFIT OF PROVISIONAL APPLICATION

This application claims benefit to U.S. Provisional Application Ser. No. 61/037,696, filed Mar. 18, 2008.

BACKGROUND OF INVENTION

The Video Electronics Standards Association (VESA) DisplayPort standard defines a flexible system and apparatus capable of transporting video, audio and other data between a Source Device and a Sink Device over a digital communications interface. The Source Device is the master and the Sink Device is the slave. The DisplayPort standard specifies an open digital communications interface for use in both internal connections and external connections regarding display technology. The DisplayPort standard addresses internal connections such as interfaces within a personal computer or monitor. In addition, the DisplayPort standard also addresses external display connections, including interfaces between a personal computer and a monitor or projector, between a personal computer and a television, or between a device such as a digital versatile disk player and a television.

A DisplayPort standard connection consists of three different channels: main link, auxiliary channel and hot plug detect. The main link features one, two or four scalable data pairs (or lanes). The main link transmission rate is determined by a number of factors, including the capabilities of the transmitter and receiver (i.e. Display and Graphics Card) and the quality of the cable. The auxiliary channel is a half-duplex and bi-directional link that is used for command and control functions sent across the interface.

When hot-plugging of the DisplayPort standard connector is detected, via the hot-plug channel, Link Training is initialized. Link Training is a process whereby the correct number of lanes are enabled at the right link rate with the correct drive current and equalization level through a handshake between the DisplayPort transmitter (display) and the receiver (graphics card) via the auxiliary channel (AUX CH). Link Training is successfully completed when the DisplayPort receiver is synchronized to the incoming Main Link data. More specifically, Link Training is considered complete when the bit lock and symbol lock have been achieved on each of the configured lanes and all the lanes are symbol locked with proper inter-lane alignment. After Link Training has been completed the display uses the hot-plug lane to detect changes, such as when a loss of synchronization is detected.

The DisplayPort standard includes both open box-to-box connection, such as when the devices are detachable by an end user and closed, or embedded connections within devices. A closed box-to-box connection between a captive Source Device and a Sink Device pair (which are designed to only work with each other) is regarded as an embedded connection.

For an open, box-to-box connection, the DisplayPort Source Device configures the link through such a Link Training sequence as previously described. However, in the case of a closed or embedded DisplayPort connection, the DisplayPort standard is not ideal. While Full Link Training can establish a link in an embedded connection, it can not ensure that the link is the most optimal for power consumption and signal integrity. In addition, Fast Link training does not allow link status feedback to the Source Device because Hot Plug Detect (HPD) signal can be eliminated in an embedded DisplayPort device interface. Accordingly, for embedded connections, it's common that the system integrator is responsible to ensure the connection meets the requirement of the given application.

A notebook computer is an example of a device incorporating an embedded connection. In today's notebook computers, the notebook panel and the panel interface parameters are fixed and qualified by the notebook design and the Original Design Manufacturer (ODM). Notebook panel interface use pre-calibrated, pre-qualified parameter for the connection which is provided by the notebook design and the ODM.

Accordingly, there is a need for a method and apparatus that will provide improved Link Training for embedded systems employing DisplayPort connectivity. In addition, there is a need for a method and apparatus that will provide for improved power consumption and signal integrity for systems employing DisplayPort connectivity.

SUMMARY OF INVENTION

In accordance with a particular embodiment of the present invention, a preset link training method is provided wherein a set of preset parameters are loaded into a source device and a sink device of the DisplayPort device of the embedded system. Link training is then performed between the source device and the sink device utilizing the set of preset parameters. After a predetermined duration of time, the link status for each of the DisplayPort lanes is read and if the link status of the lanes indicates that the link training utilizing the set of preset parameters is successful, a link is established between the source device and the sink device. Or if the link status of the lanes indicates that the link training utilizing the set of preset parameters is unsuccessful, the source can loop back and attempt the link training again, up to five times. If the link status of the lanes indicates that the link training utilizing the set of preset parameters is unsuccessful after five attempts, the preset link training with this set of preset parameters will fail.

In accordance with a particular embodiment of the Embedded Link Training method of the present invention, a selected set of preset parameters are loaded into a source device and a sink device of the DisplayPort device of the embedded system. The selected set of preset parameters is selected from a plurality of sets of preset parameters. Link training is then performed between the source device and the sink device utilizing the selected set of preset parameters. After a predetermined duration of time, the link status for each of the DisplayPort lanes is read and if the link status of the lanes indicates that the link training utilizing the first set of preset parameters is successful, a link is established between the source device and the sink device. Or if the link status of the lanes indicates that the link training utilizing the selected of set of preset parameters is unsuccessful, a different set of preset parameters are loaded and link training is performed again between the source device and the sink device utilizing the different set of preset parameters. This process is repeated with each set of parameters until the link status of the lanes indicates that the link training has been successful.

In accordance with an embodiment of the present invention, an Embedded Link Training system is provided including a preset selection circuit for loading a plurality of sets of preset parameters, a source device, a sink device coupled to the source device through a DisplayPort bus and embedded link training control circuitry coupled to the preset selection circuit, the source device and the sink device. The Embedded Link Training system in accordance with the present invention can be implemented in hardware, software or a combination of both hardware and software. The embedded link training control circuitry is adapted for loading a selected set of the plurality of sets of preset parameters into the source device and the sink device, for initiating link training between the source device and the sink device utilizing the first set of preset parameters, and for reading a link status of the at least one lane. Upon reading the link status, if the link status of the at least one lane indicates that the link training utilizing the selected set of preset parameters is successful, the embedded link training control circuitry is adapted for establishing a link between the source device and the sink device, or if the link status of the at least one lane indicates that the link training utilizing the selected set of set of preset parameters is unsuccessful, the embedded link training control circuitry is adapted for loading a different set of preset parameters and performing link training between the source device and the sink device utilizing the different set of preset parameters and repeating the steps of loading, performing and reading with each of the plurality of sets of preset parameters until the link status of the at least one lane indicates that the link training is successful.

In one embodiment each of the sets of preset parameters comprises a voltage swing level for the source device and a pre-emphasis level for the source device. The combination of the voltage swing level and the pre-emphasis level of the Source Device determine the strength of the transmitted signal. These parameters are also directly related to the power consumption of the system.

Accordingly, the methods and apparatus of the present invention allow for setting these parameters to a minimum level for the purpose of reducing the power consumption, but at a sufficient strength in order to establish a reliable connection between the Source and the Sink. Thereby, improved power consumption is obtained.

The present invention provides an improved method and system for Link Training in embedded systems employing DisplayPort connectivity. With the present invention, an improved link is established that minimizes power consumption of the system.

Other objects and advantages of the invention will become apparent upon reading the following detailed description and upon reference to the accompanying drawings.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The present invention provides a system and method for Link Training in embedded systems, including, but not limited to a notebook computer employing DisplayPort connectivity.

In accordance with a particular embodiment of the present invention, a preset link training method is provided wherein the notebook designer or Original Design Manufacturer (ODM) of the notebook computer identifies a set of parameters for use in Link Training of the DisplayPort connection. In a particular embodiment, a set of these preset parameters is referred to as a “PRESET”. In the present embodiment each PRESET includes parameters for the Source Device of the notebook, including, but not limited to voltage swing level and pre-emphasis level and parameters for the Sink Device, including, but not limited to equalizer level. The combination of the voltage swing level and the pre-emphasis level of the Source Device determine the strength of the transmitted signal. These parameters are also directly related to the power consumption of the system. Accordingly, it is desired to set these parameters to a minimum level for the purpose of reducing the power consumption, but also to a sufficient strength in order to establish a reliable connection between the Source and the Sink. An equalizer level is also provided within the PRESET parameters for the Sink Device, wherein the equalizer level is used to mitigate the detrimental effects inherent in the DisplayPort communication link between the Source Device and the Sink Device. The Preset Link Training method of the present invention utilizes the pre-qualified PRESET to perform Link Training and to establish a good link between the Source Device and the Sink Device.

Figure 1:
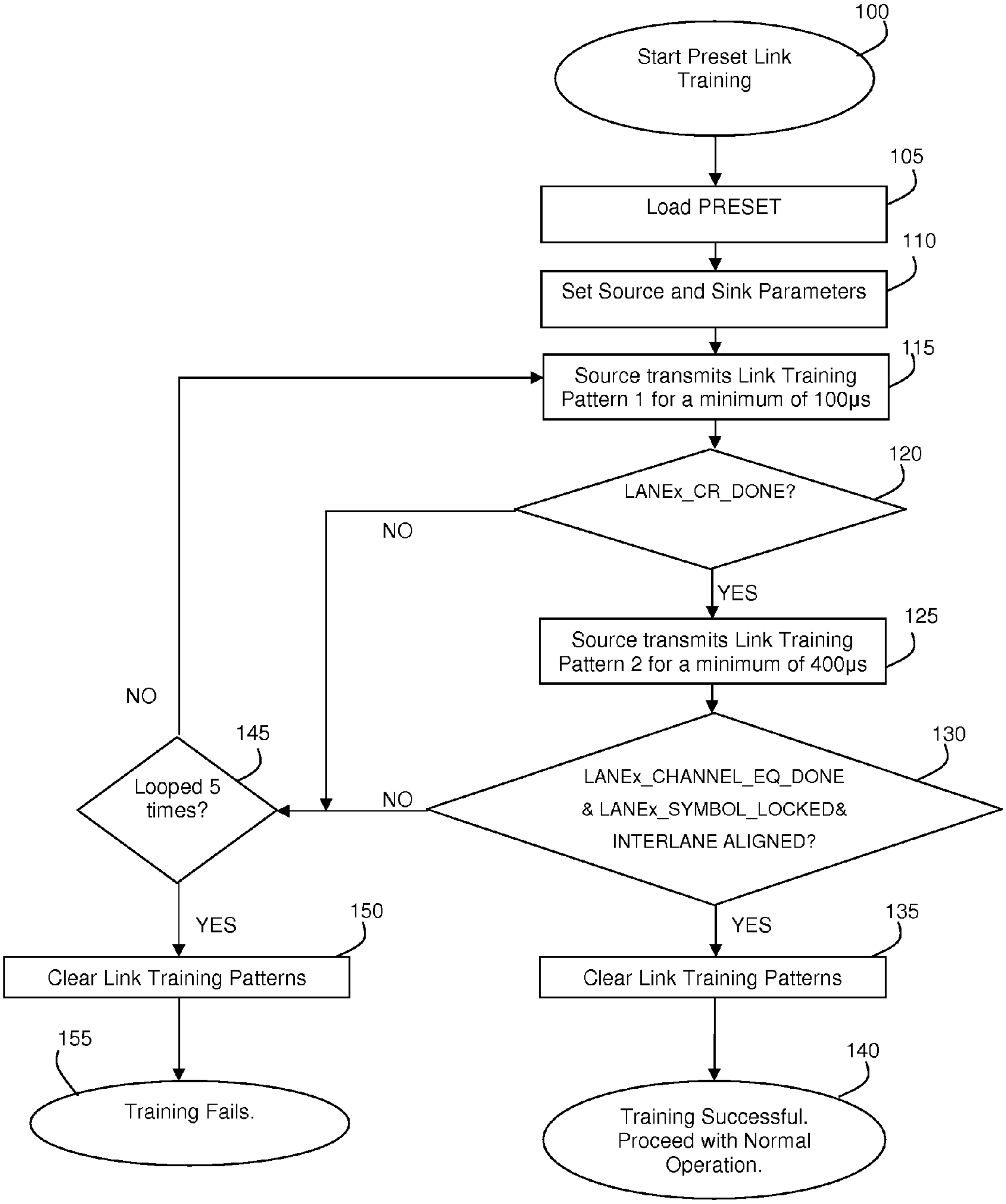
FIG. 1 is a flow diagram illustrating a Preset Link Training method in accordance with an embodiment of the present invention.

Referring now to FIG. 1, the method steps in accordance with a Preset Link Training embodiment of the present invention are illustrated. Preset Link Training is initiated utilizing a pre-qualified PRESET identified by the ODM 100. Accordingly, the PRESET is loaded 105 which sets the Source Device parameters and writes the Sink Device parameters to the Sink Device specified DisplayPort configuration data (DPCD) register 110. The system then performs Link Training using the parameters of the loaded PRESET. In the Link Training, the Source transmits Link Training Pattern 1 for a minimum of 100 μs 115. The status of the clock-recovery sequence is then read 120 to determine if the clock-recovery lock has been achieved. If the clock-recovery lock has not been achieved, then the system loops back to attempt the clock-recovery lock again, for a maximum of five attempts 145. After five attempts, if the clock-recovery lock is not achieved the training patterns are cleared 150 and the training fails 155. However, if the clock-recovery lock has been achieved, then the Source transmits Link Training Pattern 2 for a minimum of 400 μs 125. The Source Device then reads the status of the lanes 130, including the bit lock, symbol lock and inter-lane alignment, and if the status indicates that the training has completed successfully, the Link Training is considered a success if a good link has been established between the Source Device and the Sink Device. If the Link Training is successful, then the link training patterns are cleared 135 and the Link Training process is complete 140. However, if the lane status indicates that a good link has not been established utilizing the PRESET, then the system loops back to retransmit Link Training Pattern 1 115 and Link Training Pattern 2 125 to attempt to establish a good link. The system loops back for a maximum of five attempts 145. After five attempts, if the Link Training is not successful, then the training patterns are cleared 150 and the training fails 155.

The Preset Link Training in accordance with an embodiment of the present invention uses Link Training Pattern 1 and Link Training Pattern 2 to establish a good link. According to the present invention, first the parameters are loaded from the PRESET into the Source Device and the Sink Device, and then Link Training Pattern 1 is sent from the Source Device to the Sink Device for a minimum of 100 μs and Link Training Pattern 2 is sent from the Source Device to the Sink Device for a minimum of 400 μs. Link Training Pattern 1 and Link Training Pattern 2 are known in the art as in DisplayPort Specification v1.1a incorporated herein by reference. The Sink Device uses Link Training Pattern 1 to establish clock-recovery lock and Link Training Pattern 2 to establish bit lock, symbol lock and inter-lane alignment and to set the link status bits (LAN Ex_CHANNEL_EQ_DONE, LAN Ex_SYMBOL_LOCK_DONE and INTERLANE_ALIGN_DONE, also known as LANEx_x_STATUS). The Source Device then reads the link status bits of each of the lanes to determine if the link is good. If the link status bits indicate that the link is good, the link training is complete.

In accordance with a particular embodiment of the method of the present invention, an Embedded Link Training method is provided wherein the notebook designer or Original Design Manufacturer (ODM) of the notebook computer pre-calibrates or pre-qualifies several sets of parameters for use in Link Training of the DisplayPort connection. In a particular embodiment, each set of these preset parameters is referred to as a "PRESET". In the present embodiment, each PRESET includes parameters for the Source Device of the notebook, including, but not limited to voltage swing level and pre-emphasis level and parameters for the Sink Device, including, but not limited to equalizer level. The combination of the voltage swing level and the pre-emphasis level of the Source Device determine the strength of the transmitted signal. These parameters are also directly related to the power consumption of the system. Accordingly, it is desired to set these parameters to a minimum level for the purpose of reducing the power consumption, but also to a sufficient strength in order to establish a reliable connection between the Source and the Sink. Each PRESET also includes an equalizer level for the Sink Device, wherein the equalizer level is used to mitigate the detrimental effects inherent in the DisplayPort communication link between the Source Device and the Sink Device. The Embedded Link Training method of the present invention utilizes the pre-qualified PRESETs to perform Link Training and to establish a good link between the Source Device and the Sink Device.

Figure 2:
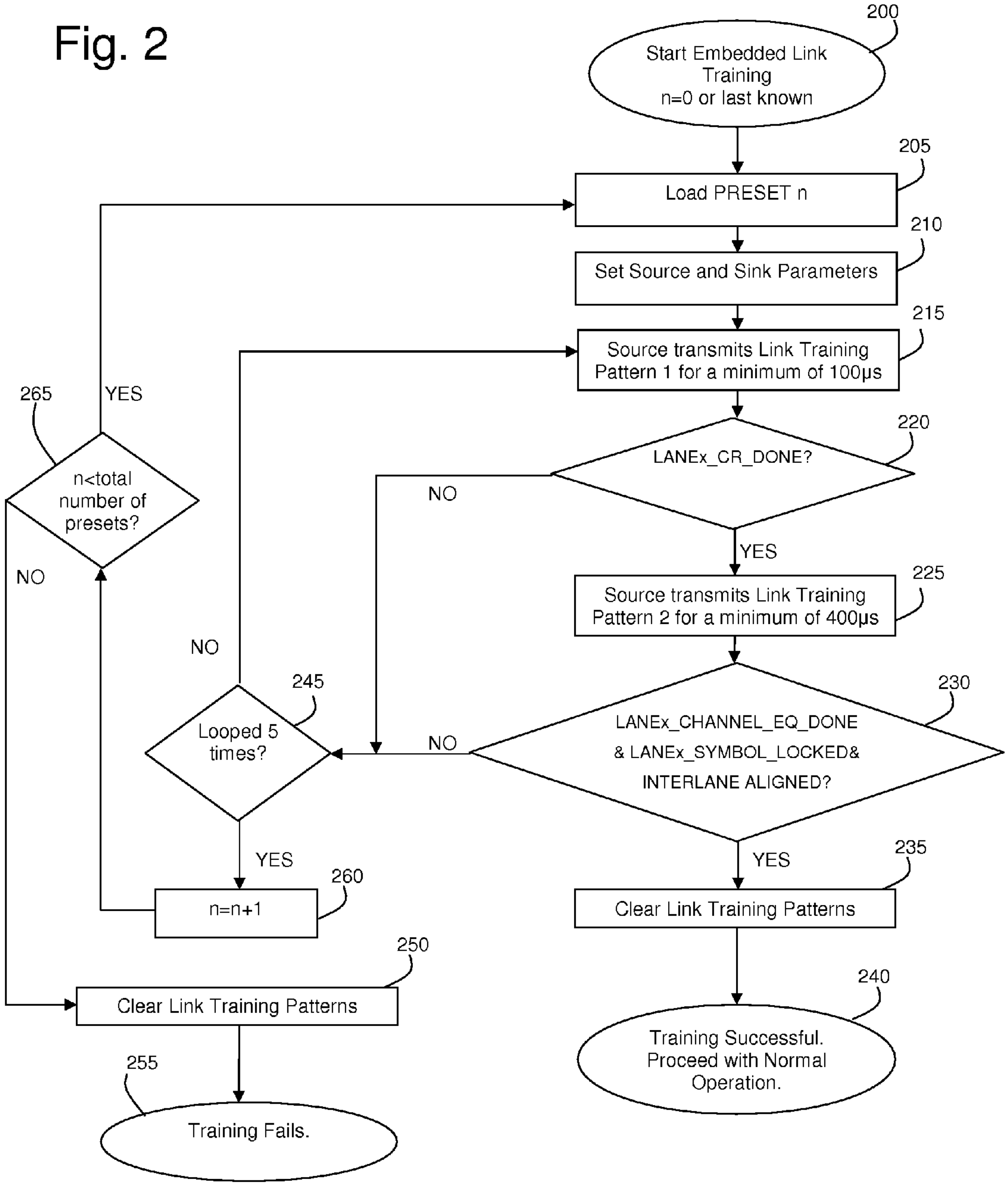
FIG. 2 is a flow diagram illustrating an Embedded Link Training method in accordance with an embodiment of the present invention.

Referring now to FIG. 2, the method steps in accordance with an embodiment of the Embedded Link Training method of the present invention are illustrated. Embedded Link Training is initiated utilizing a selected pre-qualified PRESET identified by the ODM 200 or the last-known-good PRESET. Accordingly, a selected PRESET is loaded 205 which sets the Source Device parameters and writes the Sink Device parameters to the Sink Device specified DisplayPort configuration data (DPCD) register 210. The system then performs Link Training using the PRESET. In the Link Training, the Source transmits Link Training Pattern 1 for a minimum of 100 μs 215. The status of the clock-recovery sequence is then read to determine if the clock recovery lock has been achieved 220. If the clock-recovery lock has not been achieved, then the system loops back to attempt the clock-recovery lock again utilizing the selected PRESET, for a maximum of five attempts 245. After five attempts with the first PRESET, if the clock-recovery lock is not achieved, then the system increments the PRESET 260 and if the number of available PRESETs has not been exceeded 265, the system loads the next PRESET 205 and begins the Link Training again by loading the source and sink parameters 210. Once the clock-recovery lock is achieved 220 utilizing one of the available PRESETS, the Source then transmits Link Training Pattern 2 for a minimum of 400 μs 225 and the Source Device then reads the status of the lanes 230, including the bit lock, symbol lock and inter-lane alignment, and if the status indicates that the training has completed successfully, the Link Training is considered a success and a good link has been established between the Source Device and the Sink Device using the selected PRESET. If the Link Training is successful, then the Link Training Patterns are cleared 235 and the Link Training process is complete 240 and the system proceeds with normal operation of transmitting and receiving between the Source Device and the Sink Device However, if the lane status indicates that a good link has not been established utilizing the selected PRESET, the system will loop back and attempt the Link Training again, beginning with transmitting Link Training Pattern 1 215, for up to a total of five attempts 245. If after five attempts, the Link Training utilizing the selected PRESET is unsuccessful, then the system increments the PRESET 260 and if the number of available PRESETS has not been exceeded 265, the system loads a next PRESET 205 and begins the Link Training again by loading the source and sink parameters 210 for the next PRESET. The Link Training process is then repeated with this next PRESET. The process cycles through each of the different sets of pre-qualified parameters (PRESETs) until a good link is established or it is determined that a good link cannot be established. If a good link cannot be established, as indicated by the status of the bit lock, symbol lock and inter-lane alignment, then the Link Training Patterns are cleared 250 and the Link Training fails 255.

The Embedded Link Training in accordance with an embodiment of the present invention uses Link Training Pattern 1 and Link Training Pattern 2 to establish a good link. According to the present invention, first the parameters are loaded from the PRESET into the Source Device and the Sink Device, and then Link Training Pattern 1 is sent from the Source Device to the Sink Device for a minimum of 100 μs and Link Training Pattern 2 is sent from the Source Device to the Sink Device for a minimum of 400 μs. Link Training Pattern 1 and Link Training Pattern 2 are known in the art as in DisplayPort Specification v1.1a incorporated herein by reference. The Sink Device uses Link Training Pattern 1 to establish clock-recovery lock and Link Training Pattern 2 to establish bit lock, symbol lock and inter-lane alignment and to set the link status bits (LAN_Ex_CHANNEL_EQ_DONE, LANEx_SYMBOL_LOCK_DONE and INTERLANE_ALIGN_DONE, also known as LANEx_x_STATUS). The Source Device then reads the link status bits of each of the lanes to determine if the link is good. If the link status bits indicate that the link is good, the link training is complete and a link is established between the source device and the sink device In a particular embodiment of the present invention, the display port is embedded and therefore Hot Plug Detect (HPD) line may not be used. If HPD is not used, the PRESETs are used to establish the link and the Source Device is designed to intermittently poll the link status as previously described to ensure that a good link still exists.

In a particular embodiment, the PRESETs are arranged in order of the most optimal parameters to the most conservative parameters. Therefore, if the notebook designer identifies four PRESETs for the DisplayPort connection, the first PRESET to be loaded for Link Training is the preset that provides the best performance characteristics (e.g., the highest power savings) and the fourth PRESET is the most conservative (e.g. the best possibility to establish good link). In this manner, the Embedded Link Training is performed beginning with the best performance characteristics first. In addition, the Embedded Link Training may begin with a last-known-good PRESET.

Figure 3:
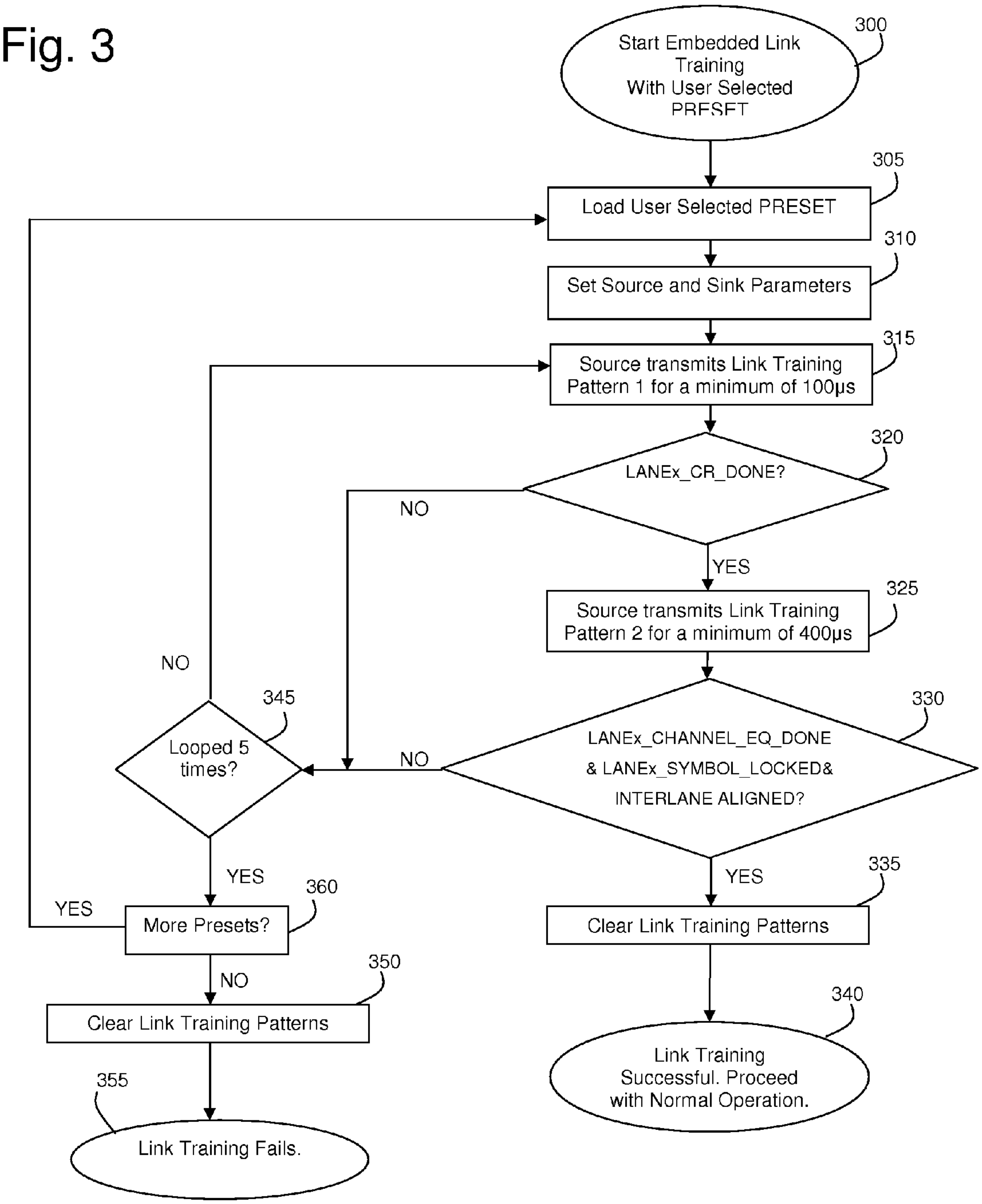
FIG. 3 is a flow diagram illustrating an Embedded Link Training method in accordance with an embodiment of the present invention utilizing a user selected PRESET.

In an additional embodiment, illustrated with reference to FIG. 3, Embedded Link Training is initiated utilizing a pre-qualified PRESET that has been manually selected by a user 300. After a user has selected one of the pre-qualified PRESETs, the parameters of the selected PRESET are loaded 305 which then sets the Source Device parameters and writes the Sink Device parameters to the Sink Device specified DisplayPort configuration data (DPCD) register 310. The system then performs Link Training using the PRESET parameters. In the Link Training, the Source transmits Link Training Pattern 1 for a minimum of 100 μs 315. The status of the clock-recovery sequence is then read to determine if the clock recovery lock has been achieved 320. If the clock-recovery lock has not been achieved, then the system loops back to attempt the clock-recovery lock again utilizing the first PRESET, for a maximum of five attempts 345. After five attempts with the first PRESET, if the clock-recovery lock is not achieved, then the system allows the user to select another PRESET 360 from the available PRESETS. The system loads the next PRESET 305 and begins the Link Training again by loading the source and sink parameters 310. Once the clock-recovery lock is achieved 320 utilizing one of the available PRESETS, the Source then transmits Link Training Pattern 2 for a minimum of 400 μs 325 and the Source Device then reads the status of the lanes 330, including the bit lock, symbol lock and inter-lane alignment, and if the status indicates that the training has completed successfully, the Link Training is considered a success and a good link has been established between the Source Device and the Sink Device. If the Link Training is successful, then the Link Training Patterns are cleared 335 and the Link Training process is complete 340 and a link is established between the Source Device and the Sink Device using the selected PRESET. However, if the lane status indicates that a good link has not been established utilizing the current PRESET, the system will loop back and attempt the Link Training again, beginning with transmitting Link Training Pattern 1 315, for up to a total of five attempts 345. If after five attempts, the Link Training utilizing the current PRESET is unsuccessful, then the system will allow the user to select another PRESET and begin the Link Training again by loading the source and sink parameters 310 for the selected PRESET. The Link Training process is then repeated with this next PRESET. The process cycles through each of the different sets of preset parameters (PRESETs) selected by the user until a good link is established or it is determined that a good link cannot be established. If a good link cannot be established then the Link Training Patterns are cleared 350 and the Link Training fails 355.

Figure 4:
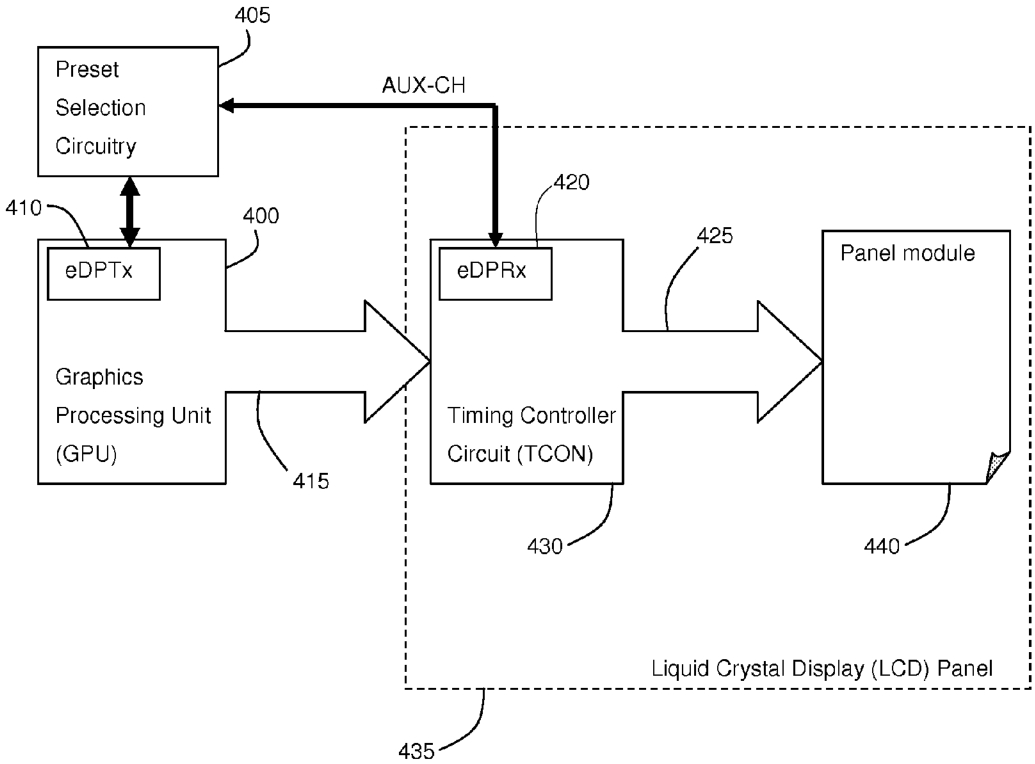
FIG. 4 is a diagrammatic view of an Embedded Link Training system in accordance with an embodiment of the present invention.

In accordance with an additional embodiment of the present invention, a system for implementing the Embedded Link Training is illustrated with reference to FIG. 4. In this embodiment, the preset parameters (PRESET) are first loaded into the Graphics Processing Unit (GPU) 400 and the Liquid Crystal Display (LCD) panel 435 of a notebook computer from the preset selection circuitry 405. In this embodiment, the Graphics Processing Unit (GPU) 400 of the notebook computer is considered the Source Device and includes the Embedded DisplayPort Transmitter (eDPTx) circuitry 410 for receiving the preset parameters for the Source Device. The Liquid Crystal Display (LCD) Panel 435 of the notebook computer includes a Timing Controller (TCON) circuit 430 and the panel module (including column driver, raw driver) 440. TCON circuit 430 is considered the Sink Device for the system. TCON circuit 430 includes Embedded DisplayPort Receiver (eDPRx) circuitry 420 for receiving the preset parameters from the preset selection circuitry 405. The Embedded DisplayPort Transmitter (eDPTx) circuitry 410 in combination with the Embedded DisplayPort Receiver (eDPRx) circuitry 420 comprises the Embedded Link Training control circuitry. The Training Pattern 1 and Training Pattern 2 are transmitted across the DisplayPort Bus 415 from the GPU 400 to the TCON 430. As previously described, The Link Training Pattern 1 and Link Training Pattern 2 are known by the Sink Device (TCON circuit 430) and upon receipt of the patterns from the Source Device (GPU 400), the Sink Device (TCON circuit 430) attempts to establish a good link with the Source Device 400 across the lanes of the DisplayPort Bus 415. After the transmission of the patterns for a minimum of 100 μs and 400 us, the Device 400 reads the status of the lanes, including the clock lock, symbol lock and inter-lane alignment, which have been set by the Sink Device (TCON circuit 430), and if the status indicates that the training has completed successfully, the Link Training is considered a success and a good link is established between the Source Device 400 and the Sink Device (TCON circuit 430). After the successful establishment of a good link, the data signals are sent to the panel module 440 across the TCON bus 425.

In the case of a computer, the Source Device 400 is a GPU which includes the Embedded DisplayPort Transmitter (eDPTx) circuitry 410 and the Sink Device 430 is an LCD panel which includes the Embedded DisplayPort Receiver (eDPRx) 420 and the panel module 440. After a good link has been established between the GPU and the LCD panel through the Embedded DisplayPort Transmitter (eDPTx) circuitry 410 and the Embedded DisplayPort Receiver (eDPRx) 420, display data is then transmitted from the GPU to the LCD for display on the panel module 440.

The Embedded DisplayPort Transmitter (eDPTx) circuitry 410 is responsible for transmitting the training patterns to establish the link between the Source Device 400 and the Sink Device 430 and for transmitting video, and other data between the Source Device 400 and the Sink Device 430 over the DisplayPort connection after the link has been established. The Embedded DisplayPort Receiver (eDPRx) 420 is responsible for receiving the training patterns from the Embedded DisplayPort Transmitter (eDPTx) circuitry 410 and for establishing the link between the Source Device 400 and the Sink Device 430 and for receiving video, and other data over the DisplayPort connection to be transmitted to a video display or audio device.

In a particular embodiment the preset parameters (PRESETs) are stored in the display port configuration data (DPCD) register of the Embedded DisplayPort Transmitter (eDPRx) circuitry 420 of the Sink Device 430. The preset selection circuitry 405 is programmed to select a set of preset parameters (PRESETs) stored in the DPCD register and to load the preset parameters into the Source Device 400 and the Sink Device 430. Loading the preset parameters into the Source Device 400 and the Sink Device 430 sets the pre-emphasis and voltage swing of the Source Device 400 and the equalizer level of the Sink Device 430. In a particular embodiment, the preset selection circuitry 405 is programmed to automatically select the set of preset parameters based upon a predetermined sequence.

In another embodiment, the preset selection circuitry 405 is accessible by a user through the system BIOS and/or a utility tool and the user may manually select which of the sets of preset parameters to use to perform the Embedded Link Training. Manual selection provides the ability to balance the signal strength and power consumption of the DisplayPort channel as required by the user. The preset selection circuitry 405 includes logic to send the selected set of preset parameters to the Sink Device 430 and the Source Device 400 prior to performing the Embedded Link Training.

In the present embodiment, the embodiments of FIGS. 1-4 comply with Video Electronics Standards Association (VESA) DisplayPort Standard Version 1, Revision 1a, on Jan. 11, 2008, which is incorporated herein by reference in its entirety.

The present invention provides an improved method and system for Link Training in embedded systems employing DisplayPort connectivity. With the present invention, an improved link can be established that minimizes power consumption and provides the best signal integrity of the system.

The preferred embodiment of the present invention is thus described. While the present invention has been described in particular embodiments, it should be appreciated that the present invention should not be construed as limited by such embodiments, but rather construed according to the following claims.

What is claimed is:

1. A method for link training in an embedded system DisplayPort device, the DisplayPort device having at least one lane, the method comprising:

selecting a set of preset parameters of a plurality of sets of preset parameters;

loading the selected set of preset parameters into a source device and a sink device of the DisplayPort device of the embedded system;

performing link training between the source device and the sink device utilizing the selected set of preset parameters;

reading a link status of the at least one lane;

if the link status of the at least one lane indicates that the link training utilizing the selected set of preset parameters is successful, then a link is established between the source device and the sink device utilizing the selected set of preset parameters, and if the link status of the at least one lane indicates that the link training utilizing the selected set of preset parameters is unsuccessful, repeating the steps of selecting, loading, performing and reading using different sets of preset parameters until the link status of the at least one lane indicates that the link training is successful.

2. The method of claim 1 wherein the at least one lane further comprises a plurality of lanes and wherein each of the plurality of lanes has an associated link status.

3. The method of claim 1, wherein each of the sets of preset parameters comprises a voltage swing level for the source device.

4. The method of claim 1, wherein each of the sets of preset parameters comprises a pre-emphasis level for the source device.

5. The method of claim 1, wherein each of the sets of preset parameters comprises an equalizer level for the sink device.

6. The method of claim 1, wherein each of the sets of preset parameters are loaded in a predetermined order beginning with a set of preset parameters having the best performance characteristics and ending with the most conservative set of preset parameters.

7. The method of claim 1, wherein the selected set of preset parameters of the plurality of preset parameters is a last-known set of preset parameters.

8. The method of claim 1, wherein selecting the set of preset parameters further comprises automatically selecting the set of preset parameters according to a predetermined sequence.

9. The method of claim 1, wherein selecting the set of present parameters further comprises manually selecting the set of preset parameters.

10. The method of claim 1, wherein the link status includes a clock recovery status, bit lock status, a symbol lock status and an inter-lane alignment status for each of the at least one lane.

11. The method of claim 1, wherein link training is performed by transmitting a Link Training Pattern 1 and a Link Training Pattern 2 from the source device to the sink device, wherein the Link Training Pattern 1 and the Link Training Pattern 2 are known by the source device.

12. The method of claim 11, wherein the Link Training Pattern 1 is transmitted for a minimum of 100 μs and the Link Training Pattern 2 is transmitted for a minimum of 400 μs.

13. The method of claim 1, wherein the steps of loading, performing and reading are performed a maximum of five times with each selected set of preset parameters.

14. The method of claim 12, wherein the link status includes a clock recovery status, a bit lock status, a symbol lock status and an inter-lane alignment status for each of the at least one lanes and wherein the clock recovery status is read after the Link Training Pattern 1 has been transmitted and the bit lock status, the symbol lock status and the inter-lane alignment status are read after the Link Training Pattern 2 has been transmitted.

15. The method of claim 14, further comprising repeating the steps of transmitting the Link Training Pattern 1 and reading the clock recovery status for a maximum of five times if the clock recovery is unsuccessful.

16. The method of claim 14, further comprising repeating the step of transmitting the Link Training Pattern 2 and reading the bit lock status, the symbol lock status and the inter-lane alignment status for a maximum of five times if the bit lock status, the symbol lock status and the inter-lane alignment are unsuccessful.

17. A link training system for an embedded system DisplayPort device comprising at least one lane, the system comprising:

a preset selection circuit for storing a plurality of sets of preset parameters;

a source device;

a sink device coupled to the source device through a DisplayPort;

embedded link training control circuitry coupled to the preset selection circuit, the source device and the sink device, the embedded link training control circuitry for loading a selected set of the plurality of sets of preset parameters into the source device and the sink device, for initiating link training between the source device and the sink device utilizing the selected set of preset parameters, and for reading a link status of the at least one lane; and if the link status of the at least one lane indicates that the link training utilizing the selected set of preset parameters is successful, then a link is established between the source device and the sink device utilizing the selected set of preset parameters, or if the link status of the at least one lane indicates that the link training utilizing the selected of set of preset parameters is unsuccessful, repeating the loading a selected set of the plurality of sets of preset parameters, initiating link training and reading a link status using different sets of preset parameters until the link status of the at least one lane indicates that the link training is successful.

18. The system of claim 17 wherein the at least one lane further comprises a plurality of lanes and wherein each of the plurality lanes has an associated link status.

19. The system of claim 17, wherein each of the sets of preset parameters comprises a voltage swing level for the source device.

20. The system of claim 17, wherein each of the sets of preset parameters comprises a pre-emphasis level for the source device.

21. The system of claim 17, wherein each of the sets of preset parameters comprises an equalizer level for the sink device.

22. The system of claim 17, wherein the preset selection circuit is controlled automatically.

23. The system of claim 17, wherein the preset selection circuit is controlled manually.

24. The system of claim 17, wherein the embedded link training control circuitry further comprises an embedded DisplayPort transmitter circuit and an embedded DisplayPort receiver circuit.

25. A link training system for an embedded system DisplayPort device comprising at least one lane, the system comprising:

a preset selection circuit for selecting a plurality of sets of preset parameters, each of the plurality of sets of preset parameters including a voltage swing level for a source device, a pre-emphasis level for the source device and an equalizer level for a sink device;

a liquid crystal display panel;

a graphics processing unit coupled to the liquid crystal display panel through a DisplayPort bus;

embedded link training control circuitry coupled to the preset selection circuit, the liquid crystal display panel and the graphics processing unit, the embedded link training control circuitry for loading a selected set of the plurality of sets of preset parameters into the liquid crystal display panel and the graphics processing unit, for initiating link training between the liquid crystal display panel and the graphics processing unit utilizing the selected set of preset parameters, and for reading a link status of the at least one lane; and if the link status of the at least one lane indicates that the link training utilizing the selected set of preset parameters is successful, then a link is established between the liquid crystal display panel and the graphics processing unit using the selected set of preset parameters, or if the link status of the at least one lane indicates that the link training utilizing the selected set of preset parameters is unsuccessful, repeating the loading a selected set of the plurality of sets of preset parameters, initiating link training and reading a link status using different sets of preset parameters until the link status of the at least one lane indicates that the link training is successful.

* * * * *

UNITED STATES PATENT AND TRADEMARK OFFICE

CERTIFICATE OF CORRECTION

PATENT NO. : 7,853,731 B1
APPLICATION NO. : 12/199545
DATED : December 14, 2010
INVENTOR(S) : Zeng It is certified that error appears in the above-identified patent and that said Letters Patent is hereby corrected as shown below:

Column 5 line 25, “LAN Ex_CHANNEL_EQ_DONE” should read
--LANEx_CHANNEL_EQ_DONE--.
Column 5 lines 25-26, “LAN Ex_SYMBOL_LOCK_DONE” should read
--LANEx_SYMBOL_LOCK_DONE--.
Column 6 line 57, “LAN_Ex_CHANNEL_EQ_DONE” should read
--LANEx_CHANNEL_EQ_DONE--.

Signed and Sealed this
Twenty-sixth Day of April, 2011

David J. Kappos
*Director of the United States Patent and Trademark Office*